United States Patent
Feng et al.

(10) Patent No.: US 11,307,049 B2
(45) Date of Patent: Apr. 19, 2022

(54) METHODS, APPARATUSES, SYSTEMS, AND STORAGE MEDIA FOR STORING AND LOADING VISUAL LOCALIZATION MAPS

(71) Applicant: UISEE TECHNOLOGIES (BEIJING) CO., LTD, Beijing (CN)

(72) Inventors: Wei Feng, Beijing (CN); Wei Lin, Beijing (CN); Dan Zhang, Beijing (CN); Xin Zhou, Beijing (CN)

(73) Assignee: UISEE TECHNOLOGIES (BEIJING) CO., LTD, Beijing (CM)

( * ) Notice: Subject to any disclaimer, the term of this patent is extended or adjusted under 35 U.S.C. 154(b) by 0 days.

(21) Appl. No.: 16/627,256

(22) PCT Filed: Jul. 19, 2018

(86) PCT No.: PCT/CN2018/096313
§ 371 (c)(1),
(2) Date: Dec. 27, 2019

(87) PCT Pub. No.: WO2020/014924
PCT Pub. Date: Jan. 23, 2020

(65) Prior Publication Data
US 2021/0254995 A1 Aug. 19, 2021

(51) Int. Cl.
*G01S 13/933* (2020.01)
*G01S 13/89* (2006.01)
(Continued)

(52) U.S. Cl.
CPC ...... *G01C 21/3874* (2020.08); *G01C 21/3811* (2020.08); *G01C 21/3867* (2020.08); *G06K 9/6218* (2013.01)

(58) Field of Classification Search
CPC ............ G01C 21/3874; G06K 9/6272; G06K 9/00671; G06Q 10/1095; G05D 1/0246;
(Continued)

(56) References Cited

U.S. PATENT DOCUMENTS

| | | | |
|---|---|---|---|
| 10,152,795 B2 | 12/2018 | Flint et al. | |
| 2014/0207282 A1* | 7/2014 | Angle | G05B 15/02 700/257 |

(Continued)

FOREIGN PATENT DOCUMENTS

| | | |
|---|---|---|
| CN | 104756155 A | 7/2015 |
| CN | 105869136 A | 8/2016 |

(Continued)

OTHER PUBLICATIONS

A Large Scale Inertial Aided Visual Simultaneous Localization and Mapping (SLAM) System for Small Mobile Platforms, University of North Dakota, Aug. 2016 (Year: 2016).*

(Continued)

*Primary Examiner* — Yuri Kan
(74) *Attorney, Agent, or Firm* — MagStone Law, LLP; Enshan Hong

(57) ABSTRACT

The present disclosure provides methods, apparatuses, and storage media for storing and loading visual localization maps. The methods for storing the visual localization maps may include acquiring a visual localization map; extracting key frame abstract information of each key frame from the visual localization map; grouping the key frame abstract information of all key frames of the visual localization map; for each group, generating and storing a sub-map-file of the group using the key frame abstract information of the group; generating key frame space index information based on the key frame abstract information of all groups; and generating and storing a master map file according to the key frame space index information for indexing the sub-map-file.

19 Claims, 8 Drawing Sheets

(51) Int. Cl.
*G01C 21/00* (2006.01)
*G06K 9/62* (2022.01)

(58) Field of Classification Search
CPC ....... G06F 3/011; B25J 9/0084; G01S 13/933; G01S 13/89
See application file for complete search history.

(56) References Cited

U.S. PATENT DOCUMENTS

| | | | |
|---|---|---|---|
| 2015/0043784 A1* | 2/2015 | Flint | G06K 9/00671 382/106 |
| 2016/0379092 A1* | 12/2016 | Kutliroff | G01C 21/3833 382/158 |
| 2017/0285651 A1* | 10/2017 | Ji | G05D 1/0246 |
| 2017/0337749 A1* | 11/2017 | Nerurkar | G06F 3/038 |
| 2019/0030719 A1* | 1/2019 | Dey | G05D 1/0295 |
| 2019/0384318 A1* | 12/2019 | Fuchs | G01S 13/89 |

FOREIGN PATENT DOCUMENTS

| | | |
|---|---|---|
| CN | 105869512 A | 8/2016 |
| CN | 106289285 A | 1/2017 |
| CN | 106371445 A | 2/2017 |
| CN | 107004028 A | 8/2017 |
| CN | 108256574 A | 7/2018 |
| JP | 2016534450 A | 4/2016 |
| WO | 2017109977 A1 | 6/2017 |

OTHER PUBLICATIONS

The State Intellectual Property Office, P. R. China, Written Opinion of the International Searching Authority for International Application No. PCT/CN2018/096313, dated Apr. 17, 2019, 7 pages (including Chinese and English versions).

* cited by examiner

S1300

S1311 — Sorting the key frame abstract information of all key frames of the visual localization map according to the sizes of unique identification numbers S1312 — Grouping the sorted key frame abstract information, wherein sequence numbers of the key frame abstract information in each group are continuous, and wherein the number of pieces of key frame abstract information in each group is not greater than a grouping threshold

FIG. 2

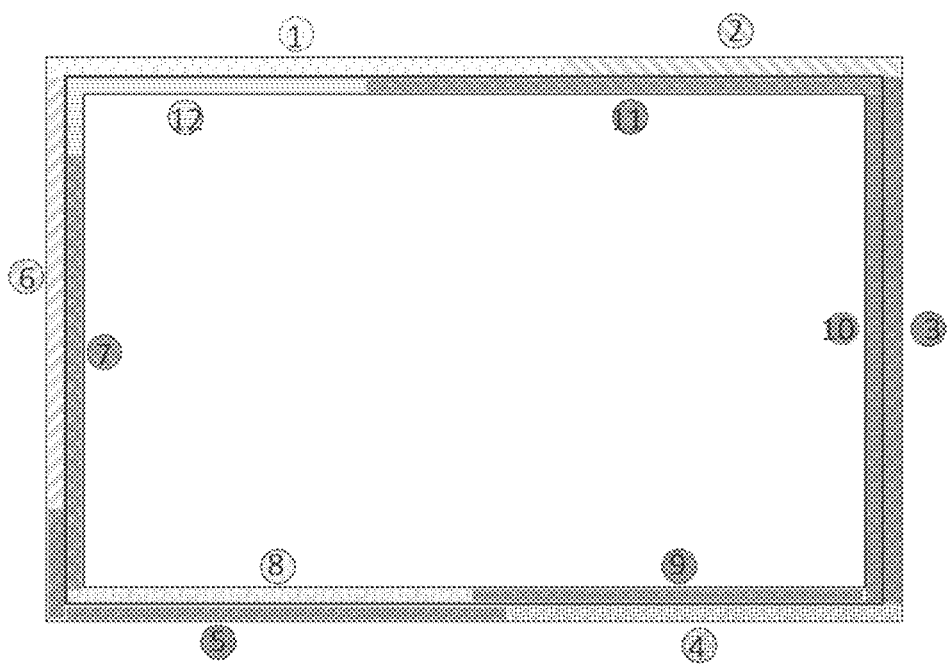

S1410 — Extracting key frames corresponding to the key frame abstract information in the group from the visual localization map, and filling the key frames in the map sub-file of the group S1420 — Extracting map points matching the key frame abstract information in the group from the visual localization map, and filling the map points in the map sub-file of the group

S1500

S1600

US 11,307,049 B2

METHODS, APPARATUSES, SYSTEMS, AND STORAGE MEDIA FOR STORING AND LOADING VISUAL LOCALIZATION MAPS

CROSS-REFERENCE TO RELATED APPLICATION

This application is a national phase application of International Application No. PCT/CN2018/096313, filed on Jul. 19, 2018, which is hereby incorporated by reference in its entirety.

TECHNICAL FIELDS

The present disclosure relates to the field of artificial intelligence, and more particularly to methods, apparatuses, systems, and storage media for storing and loading visual localization maps.

BACKGROUND

A visual localization map is a map obtained by visual localization and mapping, which is usually constructed using visual simultaneously localization and mapping (SLAM) technologies. Key frames and map point information are acquired during the construction of the visual localization map. Each key frame has a matched map point. The key frames, the map points and their matching relationship form a typical visual localization map. Due to a complex cross-reference relationship between data elements of the visual localization map, existing solutions typically store and load visual localization map as a complete single map file for use. This brings two problems in practice. First, since only the entire map may be loaded and used, when the visual localization map of a large scene is running, the memory overhead is required to be very large. Second, the visual localization map file is very large, resulting in a long loading time during a cold start of a visual localization system.

Therefore, a novel visual localization map storage and loading technology is urgently needed to solve the above problems.

SUMMARY

The present disclosure is provided in view of the above problems. The present disclosure provides a visual localization map storage method, device and system, and a storage medium, as well as a visual localization map loading method, device and system, and a storage medium.

The present disclosure provides a method for visual localization map storage, including:

acquiring a visual localization map;

extracting key frame abstract information of each key frame of the visual localization map;

grouping the key frame abstract information of all key frames of the visual localization map into one or more groups;

for each of the groups, generating and storing a sub-map-file of the group using the key frame abstract information of the group;

generating key frame space index information based on the key frame abstract information of all groups; and generating and storing a master map file according to the key frame space index information for indexing the sub-map-file.

In some embodiments, the key frame abstract information may include unique identification numbers of the key frames. In some embodiments, grouping the key frame abstract information of all key frames in the visual localization map may include:

grouping the key frame abstract information of all key frames in the visual localization map according to the unique identification numbers.

In some embodiments, grouping the key frame abstract information of all key frames in the visual localization map according to the unique identification numbers may include:

sorting the key frame abstract information of all key frames in the visual localization map according to the sizes of the unique identification numbers; and grouping the sorted key frame abstract information, wherein sequence numbers of the key frame abstract information in each group are continuous, and the number of pieces of key frame abstract information in each group is not greater than a grouping threshold.

In some embodiments, grouping the sorted key frame abstract information may include:

dividing the $(S \times i+1)^{th}$ to $(S \times i+S)^{th}$ pieces of the sorted key frame abstract information into the $(i+1)^{th}$ group, wherein S is equal to the grouping threshold.

$$0 \le i < \left[\frac{M}{S}\right],$$

and M represents the number of the key frames in the visual localization map; and assigning the ungrouped key frame abstract information to the last group.

In some embodiments, the key frame abstract information may include unique identification numbers and three-dimensional world coordinates of the key frames, and the grouping the key frame abstract information of all key frames in the visual localization map may include:

determining the number N of the groups according to the number M of all key frames in the visual localization map;

performing spatial clustering on the key frame abstract information of all key frames of the visual localization map according to the three-dimensional world coordinates to obtain N clusters; and grouping the key frame abstract information of all key frames in the visual localization map according to the N clusters.

In some embodiments, the grouping the key frame abstract information of all key frames in the visual localization map according to the N clusters may include: directly using each of the N clusters as a group.

In some embodiments, the determining the number N of the groups according to the number M of all key frames in the visual localization map may include:

calculating the number N of the groups by the following formula:

$$N = \left[\frac{M+S-1}{S}\right],$$

wherein S represents the grouping threshold.

In some embodiments, the grouping the key frame abstract information of all key frames in the visual localization map according to the N clusters may include:

filling the key frame abstract information of one of the N clusters in one group one by one, until all key frame abstract information in the cluster is filled, or, the number of the pieces of the key frame abstract information in the group reaches the grouping threshold S, and then, starting to fill the next group; and in the case that unoperated clusters exist in the N clusters, selecting an unoperated cluster closest to a clustering center point of the current operation cluster to repeatedly perform the filling step so as to traverse the N clusters.

In some embodiments, the for each group, generating and storing a sub-map-file of the group by using the key frame abstract information of the group may include:

extracting key frames corresponding to the key frame abstract information in the group from the visual localization map, and filling the key frames in the sub-map-file of the group; and extracting map points matching the key frame abstract information in the group from the visual localization map, and filling the map points in the sub-map-file of the group.

In some embodiments, wherein the key frame abstract information may include three-dimensional world coordinates of the key frames, and the generating key frame space index information based on the key frame abstract information of all groups may include:

constructing keywords of the key frame space index information based on the three-dimensional world coordinates of each key frame; and determining an index value of the key frame space index information based on a group number of the key frame abstract information of each key frame.

In some embodiments, the for each group, generating and storing a sub-map-file of the group by using the key frame abstract information of the group further may include: calculating a checksum of each sub-map-file.

In some embodiments, the generating and storing a master map file according to the key frame space index information may include:

constructing map metadata by using the key frame space index information and the checksum; and storing the map metadata, and outputting the same to the master map file.

According to another aspect of the present disclosure, a visual localization map storage device is further provided, including:

an acquisition module, configured to acquire a visual localization map;

an extraction module, configured to extract key frame abstract information of each key frame from the visual localization map;

a grouping module, configured to group the key frame abstract information of all key frames in the visual localization map;

a sub-file generation module configured to, for each group, generate and store a sub-map-file of the group by using the key frame abstract information of the group;

an index generation module, configured to generate key frame space index information based on the key frame abstract information of all groups; and a master file generation module configured to generate and store a master map file according to the key frame space index information for indexing the sub-map-file.

According to still another aspect of the present disclosure, a visual localization map storage system is further provided, including a processor and a memory, wherein computer program instructions are stored in the memory, and wherein the computer program instructions, when run by the processor, are configured to perform the above visual localization map storage method.

According to still another aspect of the present disclosure, a storage medium is further provided, wherein program instructions are stored on the storage medium, and the program instructions, while being run, are configured to perform the above visual localization map storage method.

In addition, according to one aspect of the present disclosure, a visual localization map loading method is further provided, including:

acquiring the master map file and the sub-map-files of the visual localization map obtained by using the above visual localization map storage method;

performing indexing from the master map file according to the three-dimensional world coordinates of a specific position to acquire group numbers of key frames corresponding to the range information of a predefined local map; and loading corresponding sub-map-files according to the group numbers to construct the local map.

In some embodiments, the range information of the predefined local map may include the number of key frames closest to the three-dimensional world coordinates of the current position.

In some embodiments, the range information of the predefined local map may include a radius distance using the three-dimensional world coordinates of the current position as the circle center.

In some embodiments, the method further may include: releasing a memory space of the sub-map-file that does not correspond to the group number in the local map.

In some embodiments, the loading corresponding sub-map-files according to the group numbers to construct the local map further may include:

acquiring a checksum of the sub-map-files corresponding to the group numbers from the master map file; and checking the sub-map-files corresponding to the group numbers according to the checksum.

According to another aspect of the present disclosure, a visual localization map loading device is further provided, including:

an acquisition module, configured to acquire the master map file and the sub-map-files of the visual localization map obtained by using the above visual localization map storage method;

an indexing module, configured to perform indexing from the master map file according to the three-dimensional world coordinates of a specific position to acquire group numbers of key frames corresponding to the range information of a predefined local map; and a construction module configured to load corresponding sub-map-files according to the group numbers to construct the local map.

According to still another aspect of the present disclosure, a visual localization map loading system is further provided, including: a processor and a memory, wherein computer program instructions are stored in the memory, and the computer program instructions, when run by the processor, are configured to perform the above visual localization map loading method.

According to still another aspect of the present disclosure, a storage medium is further provided, wherein program instructions are stored on the storage medium, and the program instructions, while being run, are configured to perform the above visual localization map loading method.

According to the visual localization map storage method, device and system and the storage medium, as well as the corresponding loading method, device and system and the storage medium provided by the embodiments of the present disclosure, a single visual localization map file with a large data size is decomposed into a plurality of sub-map-files. Therefore, it is easy to flexibly load and manage the visual localization map according to the application requirements, thereby greatly improving the scalability of the visual localization map, the loading efficiency in the application and the space efficiency during the execution.

The above description is only an overview of the technical solutions of the present disclosure, and may be implemented according to the contents of the specification, so that the technical means of the present disclosure may be clearly understood. Furthermore, in order that the above and other objects, features and advantages of the present disclosure may be more clearly understood, specific embodiments of the present disclosure will be described below.

BRIEF DESCRIPTION OF THE DRAWINGS

The above and other objects, features and advantages of the present disclosure will become more apparent by describing the embodiments of the present disclosure in more details in combination with the drawings. The drawings are used for providing a further understanding of the embodiments of the present disclosure and constitute a part of the specification. The drawings, together with the embodiments of the present disclosure, are used for explaining the present disclosure, but do not constitute limitation to the present disclosure. In the drawings, the same reference signs usually represent the same components or steps.

FIG. 2 shows a schematic flow diagram of grouping key frame abstract information of all key frames in a visual localization map according to unique identification numbers of the key frames in accordance with one embodiment of the present disclosure;

FIG. 3 shows a schematic diagram of a result of grouping key frame abstract information of all key frames in a visual localization map according to unique identification numbers of the key frames in accordance with one embodiment of the present disclosure;

DETAILED DESCRIPTION OF THE EMBODIMENTS

To clarify the objects, technical solutions and advantages of the present disclosure, examples of embodiments of the present disclosure will be given below in combination with drawings. Apparently, the embodiments described below are merely a part, but not all, of the embodiments of the present disclosure. It should be understood that the present disclosure is not limited by the exemplary embodiments described herein. Any other embodiments, obtained by those of ordinary skill in the art based on the embodiments of the present disclosure without any creative effort, should fall into the protection scope of the present disclosure.

A visual localization map may be a map obtained by visual localization and mapping. The visual localization map may include key frames, map points, and their matching relationship. A visual localization map file for a relatively larger scene may be huge. This may cause difficulties in memory overhead and load delay in practice. In an embodiment of the present disclosure, a single map file of the visual localization map may be decomposed into a plurality of sub-map-files for storage. Therefore, when in use, required sub-map-files may be selected according to actual needs to construct a local map. A visual localization map storage method according to an embodiment of the present disclosure will be described below with reference to FIG. 1.

Figure 1:
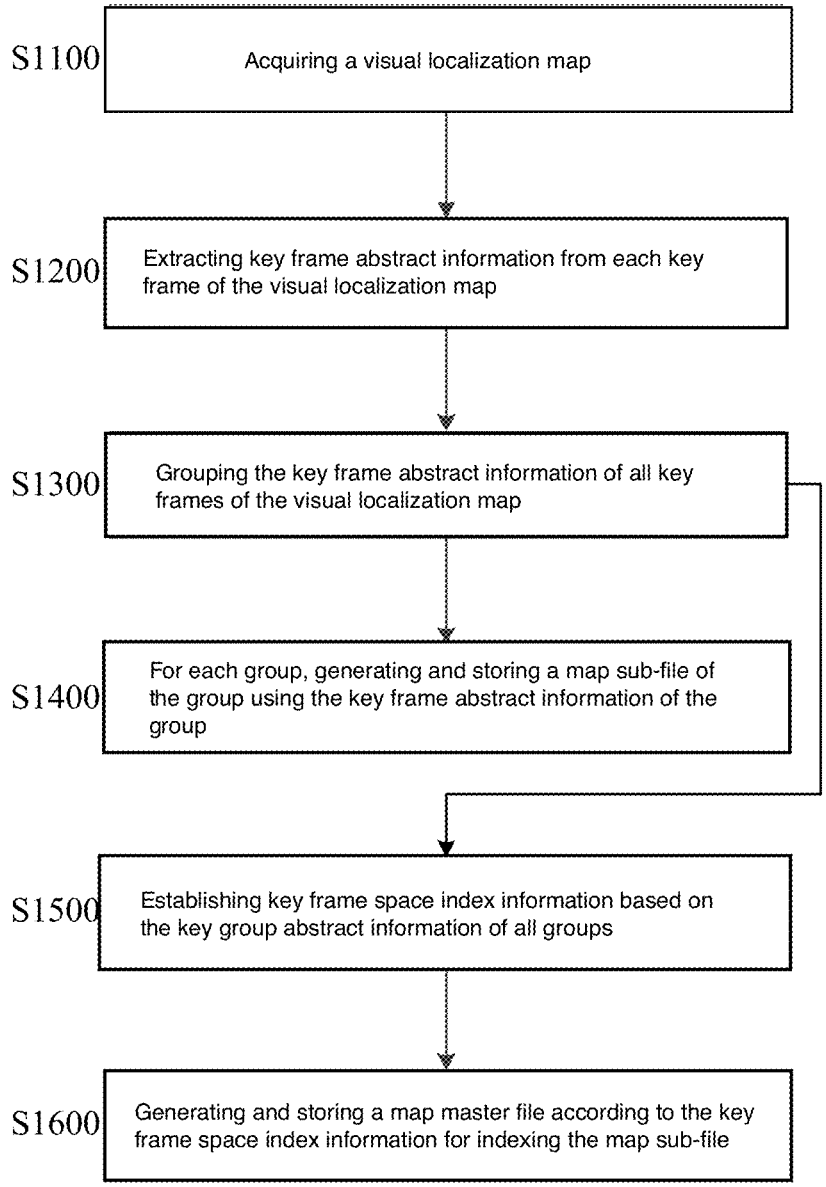
FIG. 1 shows a schematic flow diagram of a visual localization map storage method in accordance with one embodiment of the present disclosure.

FIG. 1 shows a schematic flow diagram of a method 100 for storing visual localization maps in accordance with one embodiment of the present disclosure. As shown in FIG. 1, method 1000 may include the following steps.

Step S1100, acquiring a visual localization map.

The visual localization map may be any suitable map including key frames. It may be a map constructed by any existing technologies, such as the VSLAM technology, or technology developed in the future. As an example, the visual localization map of a scene may be established in advance and is persisted to a file. The persistence method may include serializing and outputting a runtime memory instance.

Step S1200, extracting key frame abstract information from each key frame of the visual localization map acquired in step S1100.

The key frame abstract information may be minimum description data of the key frame and may include identification information and/or parameter information of the key frame. The parameter information may include 6DoF posture information of the key frame. The 6DoF posture information of the key frame may include three-dimensional world coordinates of the key frame and angles of rotation of three different directions. The corresponding key frame may be indexed through the key frame abstract information and may be also loaded, calculated, and stored, and so on.

In one example, the visual localization map may be analyzed to extract a key frame abstract information sequence. The sequence may be data formed by arranging key frame abstract information sets according to a particular order. For example, the particular order may be the order in which the key frames are created during the construction of the visual localization map.

The key frame abstract information may be used to represent the key frame and to perform processing related to the key frames. This may greatly reduce the volume of data required to be processed, thereby improving the efficiency of the system.

Step S1300, grouping the key frame abstract information of all key frames in the visual localization map obtained in step S1200.

Different groups may include the key frame abstract information of different key frames. The key frame abstract information may be grouped according to a particular rule. Grouping may be performed according to the key frame abstract information. All of the key frames in the visual localization map may be divided into a plurality of groups accordingly.

The key frame abstract information of all key frames in the visual localization map may be divided into different groups. The size of the group may be determined according to the requirements of an actual application. A relatively large group may correspond to a relatively large sub-map-file. On the other hand, a relatively small group may correspond to a relatively small sub-map-file. The size of the group may correspond to the granularity of the decomposition and storage management for a complete visual localization map.

Different grouping methods may represent methods of decomposing the complete visual localization map. For example, grouping the key frame abstract information according to a mapping trajectory may correspond to decomposition of the sub-map-files according to the mapping trajectory. As another example, grouping the key frame abstract information according to correlations of geospatial locations of the key frames may correspond to decomposition of the sub-map-file according to the correlations of the geospatial locations.

By grouping the key frame abstract information of all key frames in the visual localization map, a basis is established for the decomposition storage management of the visual localization map.

Optionally, the grouping may be performed according to information related to the localization of the key frame in the key frame abstract information for each key frame of the visual localization map. In practical applications, there are usually localization requirements. The grouping may be performed according to the localization of the key frame to facilitate the subsequent loading of the local map related to the locating position, thereby improving user experience.

Step S1400, for each group obtained in step S1300, generating and storing a sub-map-file of the group using the key frame abstract information of the group.

For each group, corresponding map data in the visual localization map are extracted using the key frame abstract information in the group to generate corresponding sub-map-files. It may be understood that the map data may include key frame data and map point data. The sub-map-files may be stored. Therefore, the single visual localization map file may be decomposed into a plurality of sub-map-files that are easy to store and load flexibly. Each sub-map-file may be used to generate a corresponding local map.

Step S1500, generating key frame space index information based on the key frame abstract information of all the groups obtained in step S1300.

The key frame space index information may be used to index the key frames corresponding to the key frame abstract information in the group based on particular information. Optionally, the particular information may be three-dimensional world coordinates of a certain spatial position. The key frames related to the spatial position, for example, a key frame having a distance less than a particular threshold from the spatial position and a particular number of key frames closest to the spatial position, may be indexed using the key frame space index information. Further, according to the key frame space index information, the information of the group to which the indexed key frame belongs may be obtained. Therefore, the sub-map-file related to the spatial position is determined.

Step S1600, generating and storing a master map file according to the key frame space index information generated in step S1500 for indexing the sub-map-file.

Map metadata may be generated according to the key frame space index information. The map metadata may be output and stored as the master map file. Thus, according to the master map file, the required sub-map-file may be indexed.

According to the above method 1000, a single visual localization map file with a large data size is decomposed into a plurality of sub-map-files. Accordingly, the visual localization map is easy to load and manage flexibly according to the application requirements, thereby greatly improving the scalability of the visual localization map, the loading efficiency in the application and the space efficiency during the execution.

Those of ordinary skill in the art may understand that, the method 1000 is only an example of the technical solution of the present disclosure and does not constitute a limitation to the technical solution of the present disclosure. For example, step S1400 does not have to be performed prior to step S1500 and step S1600. Step S1400 may be performed after step S1500 and/or step S1600 or may be performed simultaneously.

In some embodiments, the key frame abstract information described above may include unique identification numbers of the key frames. A unique identification number of each respective key frame may be a unique number assigned to the respective key frame during the construction of the visual localization map. There may be a one-to-one correspondence relationship between the unique identification numbers and the key frames. The unique identification numbers of the key frames may be ascending serial numbers according to a chronological order of the key frames acquired during the construction of the visual localization map. The unique identification numbers of adjacent key frames may be contiguous serial numbers and may also be non-contiguous serial numbers.

In some embodiments, the key frame abstract information of all key frames of the visual localization map may be grouped according to the unique identification numbers described above.

The unique identification numbers of the key frames may reflect a mapping trajectory of the visual localization map. It may be understood that, the grouping according to the unique identification numbers may be equivalent to decomposition of the visual localization map according to the mapping trajectory. This grouping method is very suitable for visual localization maps of trajectory application scenarios, such as visual localization maps of driving roads. The visual localization map may be decomposed into sub-map-files of a plurality of road sections according to a driving trajectory. When the visual localization map is applied to the automatic localization of assisted driving or automatic driving vehicles, the sub-map-files of the nearby road sections to be used may be loaded according to a current position. Therefore, the time efficiency and space efficiency of loading maps during assisted driving or automatic localization are greatly improved.

The grouping of the key frame abstract information of all key frames in the visual localization map according to the unique identification numbers is described in FIG. 2. FIG. 2 shows one embodiment of step S1300 in the method 1000. As shown in FIG. 2, step S1300 may include the following sub-steps.

Step S1311: sorting the key frame abstract information of all key frames of the visual localization map according to the sizes of the unique identification numbers of the key frames.

The sorting may be performed according to the unique identification numbers in order from small to large or from large to small. As an example, a sequence from small to large may correspond to a chronological order of the construction of the visual localization map or a forward mapping trajectory. A sequence from large to small may correspond to a reverse chronological order of the construction of the visual localization map or a reverse mapping trajectory. Each piece of sorted key frame abstract information may have a corresponding sequence number.

Step S1312, grouping the sorted key frame abstract information, wherein the sequence number of the key frame abstract information in each group is continuous, and the number of pieces of key frame abstract information in each group is not greater than a grouping threshold.

Optionally, the grouping threshold may be set to limit the size of the largest group. The sorted key frame abstract information is grouped as needed.

As an example, 500 pieces of key frame abstract information may be extracted from a visual localization map of a driving road by performing step S1200. In some embodiments, the key frame abstract information may be sorted according to step S1311 in the sequence of the unique identification numbers of the key frames from small to large. Then, the key frame abstract information may be grouped according to the key frames within a range of about 5 kilometers, and the grouping threshold is 50 pieces of key frame abstract information. Then, the result of the grouping is as follows: a first group including key frame abstract information with sequence numbers 1-30; a second group including key frame abstract information with sequence numbers 21-56; the second group including key frame abstract information with sequence numbers 57-106; . . . ; and the last group including key frame abstract information with sequence numbers 484-500. In the grouping described above, the 30 pieces of key frame abstract information included in the first group may correspond to a straight road of 5 km starting from the visual localization map; the 36 pieces of key frame abstract information included in the second group may correspond to the next turning road of about 5 km in the visual localization map; the 50 pieces key frame abstract information included in the third group may correspond to the next roundabout road of about 2 km in the visual localization map; . . . ; and the 17 pieces of key frame abstract information included in the last group may correspond to the last section of the road.

Through the above grouping method, the visual localization map may be decomposed into the sub-map-files, which are easy to load and manage according to requirements. The map loading and updating performance of localization and navigation and other applications is effectively improved.

In some embodiments, the above step S1312, grouping the sorted key frame abstract information, may include the following sub-steps.

Sub-step 1, assigning the $(S \times i+1)^{th}$ to $(S \times i+S)^{th}$ pieces of the sorted key frame abstract information to the $(i+1)^{th}$ group, wherein S is equal to the grouping threshold, $$0 \le i < \left[\frac{M}{S}\right],$$

and wherein M represents the number of the key frames in the visual localization map. Since the key frames and their key frame abstract information have a one-to-one correspondence relationship, M also represents the number of the pieces of the key frame abstract information.

For the visual localization map of a large-scale scenario, similar to the above example, grouping performed one by one according to the actual map scenario has very large workload. Optionally, the sorted key frame abstract information may be directly grouped according to the size of the grouping threshold. For example, the visual localization map including 5213 key frames is grouped, where the grouping threshold S is 50, and the number M of the key frames in the visual localization map is 5213. The value range of i (0≤i<104) is obtained by the formula $$0 \le i < \left[\frac{M}{S}\right].$$

Then, the first to $50^{th}$ pieces of the sorted key frame abstract information are divided into the first group, the $51^{th}$ to $100^{th}$ pieces of the sorted key frame abstract information are divided into the second group, . . . , and the $5151^{th}$ to $5200^{th}$ pieces of the sorted key frame abstract information are divided into the $104^{th}$ group.

Sub-step 2, dividing ungrouped key frame abstract information into the last group.

In the case that ungrouped key frame abstract information is still present after performing the grouping operations described in the above sub-step, the ungrouped key frame abstract information may be assigned to the last group. Still using the above example, the $5201^{th}$ to the $5213^{th}$ key frames are not yet grouped. The ungrouped key frame abstract information may be assigned to the last group, that is, the $105^{th}$ group. So far, the grouping of the key frame abstract information of the key frames of the visual localization map is completed.

FIG. 3 shows a schematic diagram of a result of grouping key frame abstract information of all key frames of a visual localization map according to unique identification numbers of the key frames in accordance with one embodiment of the present disclosure. Lines of different gray levels represent different groups. The serial number next to a line of a gray level is the serial number of the group. The visual localization map is a three-dimensional map, but FIG. 3 is a two-dimensional plan schematic diagram in order to easily understand the effect of the grouping. As shown in FIG. 3, the visual localization map is constructed by mapping a road in two directions. Starting from the top left corner, driving is performed clockwise to perform mapping on an outer ring road. After turning to the top left corner, driving is performed counterclockwise to perform mapping on an inner ring road. Starting from the unique identification number of the first key frame at the beginning of the mapping. The unique identification numbers of new key frames may be numbered in an ascending order. The unique identification numbers may or may not be continuous. The key frame abstract information of all key frames is sorted according to the unique identification numbers in a sequence from small to large. The sorted key frame abstract information may be grouped. The visual localization map may be decomposed into 12 sub-maps according to the grouping. As shown in FIG. 3, the decomposition of the visual localization map may correspond to a mapping trajectory.

By using the above method of performing direct grouping according to the size of the grouping threshold, the efficiency of the grouping operation may be improved. At the same time, except the last group, the number of the pieces of key frame abstract information of other groups is the same, then the sub-map-files constructed accordingly are similar in size, which is convenient for memory management.

In some embodiments, the key frame abstract information of a key frame may include unique identification numbers and three-dimensional world coordinates of the key frame. The three-dimensional world coordinates of the key frame may represent the position of a camera in a world coordinate system when the key frame is acquired.

Figure 4:
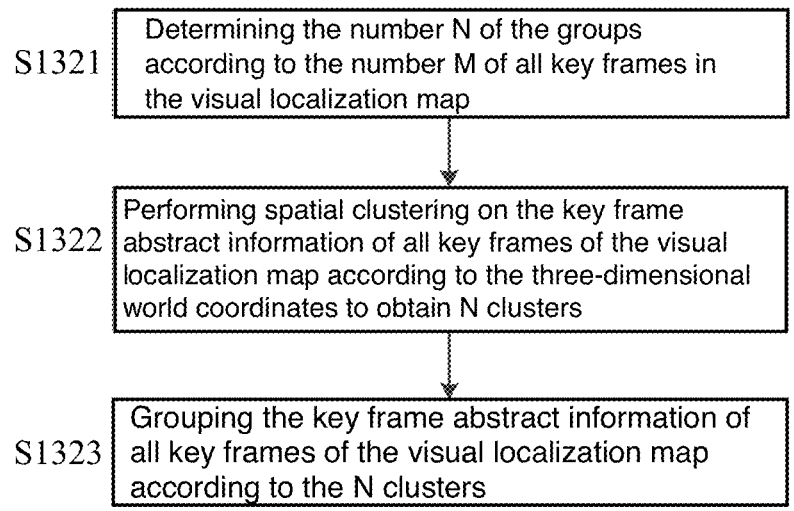
FIG. 4 shows a schematic flow diagram of grouping key frame abstract information of all key frames in a visual localization map according to the three-dimensional world coordinates of the key frames in accordance with one embodiment of the present disclosure.

In some embodiments, the key frame abstract information of all key frames in the visual localization map may be grouped according to the three-dimensional world coordinates described above. FIG. 4 shows another embodiment of step S1300 in the method 1000. As shown in FIG. 4, step S1300 may include the following sub-steps.

Step S1321, determining the number N of the groups according to the number M of all key frames in the visual localization map.

The number M of all key frames in the visual localization map may reflect the scale of the visual localization map. A proper number N of the groups may be determined according to M, so that the visual localization map may be decomposed into N sub-map-files with moderate sizes.

Step S1322, performing spatial clustering on the key frame abstract information of all key frames in the visual localization map according to the three-dimensional world coordinates to obtain N clusters.

Spatial clustering may refer to dividing the key frame abstract information into N spatially adjacent clusters according to the distances between the three-dimensional world coordinates of all key frames in the visual localization map. The spatial clustering may use classical clustering methods such as K-means, K-means++, ISODATA or the like, or other existing or future developed clustering methods. Different distance measurements will affect the clustering results, and the spatial clustering may be performed according to distance measurements such as the Euclidean distance, the Manhattan distance, the Chebyshev distance, and so on.

Through the spatial clustering, the three-dimensional world coordinates of the key frame abstract information belonging to the same cluster are relatively close, and the distances between the three-dimensional world coordinates of e key frame abstract information of different clusters may be greater.

Step S1323, grouping the key frame abstract information of all key frames of the visual localization map according to the N clusters obtained by the spatial clustering in the above step S1322.

By performing the grouping according to the above N clusters, spatially adjacent groups may be obtained. Thus, the visual localization map may be decomposed into the sub-map-files according to the spatial neighboring relationship of the key frames. The sub-map-files of the adjacent spaces may be conveniently loaded according to the current position in use, thereby improving the time efficiency of the map real-time loading switching and improving the space efficiency of the memory.

In some embodiments, each of the above N clusters may be directly used as a group. The obtained group may thus be a natural group in which the key frame has the spatial neighboring relationship. Therefore, the visual localization map may be decomposed according to the spatial relationship of the key frames, which is suitable for various application scenarios.

In some embodiments, the number N of the groups is calculated according to the number M of all key frames of the visual localization map by the following formula, in which S represents the grouping threshold:

$$N = \left[\frac{M+S-1}{S}\right].$$

Figure 5:
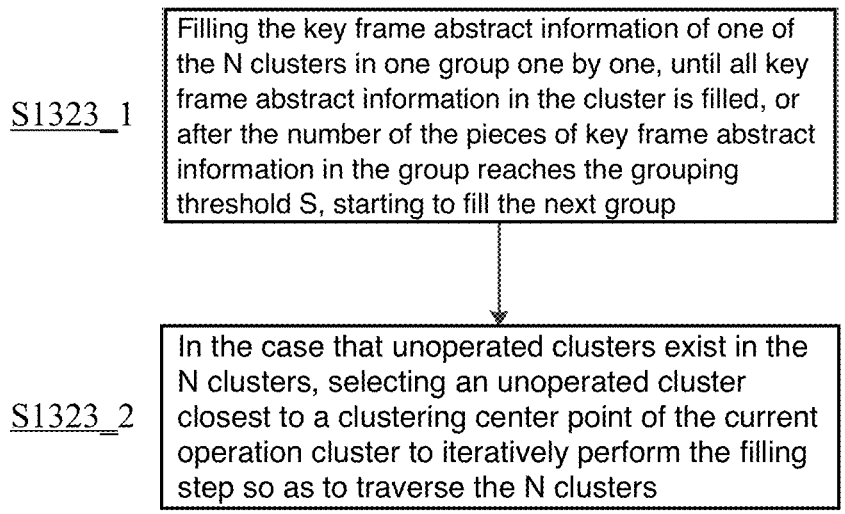
FIG. 5 shows a schematic flow diagram of grouping key frame abstract information of all key frames in a visual localization map according to N clusters of spatial clustering in accordance with one embodiment of the present disclosure.

In some embodiments, the above step S1323 may include the following sub-steps. The N clusters obtained by the spatial clustering are grouped according to the size of the grouping threshold, as shown in FIG. 5.

Sub-step S1323_1, filling the key frame abstract information of one of the N clusters in the groups one by one until all key frame abstract information in the cluster is filled, or until the number of the pieces of the key frame abstract information in the group reaches the grouping threshold S. and then, filling the next group. It may be understood that the cluster may be randomly selected from the N clusters.

In some embodiments in which the number of the pieces of key frame abstract information in the cluster is less than or equal to the grouping threshold S, the step of filling the cluster may be terminated when all key frame abstract information in the cluster is filled. In some embodiments in which the number of the pieces of key frame abstract information in the cluster is greater than the grouping threshold, the step of filling the cluster may be terminated when the number of pieces of key frame abstract information in the group reaches the grouping threshold S. The remaining ungrouped key frame abstract information in the cluster may be filled in the next group.

Sub-step S1323_2, in the embodiments in which unoperated clusters exist in the N clusters, selecting an unoperated cluster closest to a clustering center point of the current operation cluster to perform the filling step iteratively so as to traverse the N clusters. Herein, a new cluster is selected based on the distance between the clustering center points of the clusters to continue the grouping operation. This may ensure that the key frame abstract information of the key frames that are closer to each other may be grouped into the same group. For example, in the process of filling the cluster A, a part of key frame abstract information in the cluster A may be filled in group a. However, some of the key frame abstract information remains in cluster A when the number of the pieces of key frame abstract information in group a reaches the grouping threshold S. Then the remaining key frame abstract information may be filled in the next group b. If the number of the pieces of key frame abstract information in the group b does not reach the grouping threshold S, then a selected cluster B may be filled in group b. The above method of traversing the N clusters ensures that the cluster A and the cluster B are closest to each other. Therefore, it may ensure that the key frames corresponding to the key frame abstract information in the same group are closer to each other. In this way, it is ensured that the distance between the key frames in each sub-map-file is relatively small, which ensures the loading efficiency of the local map.

Figure 6:
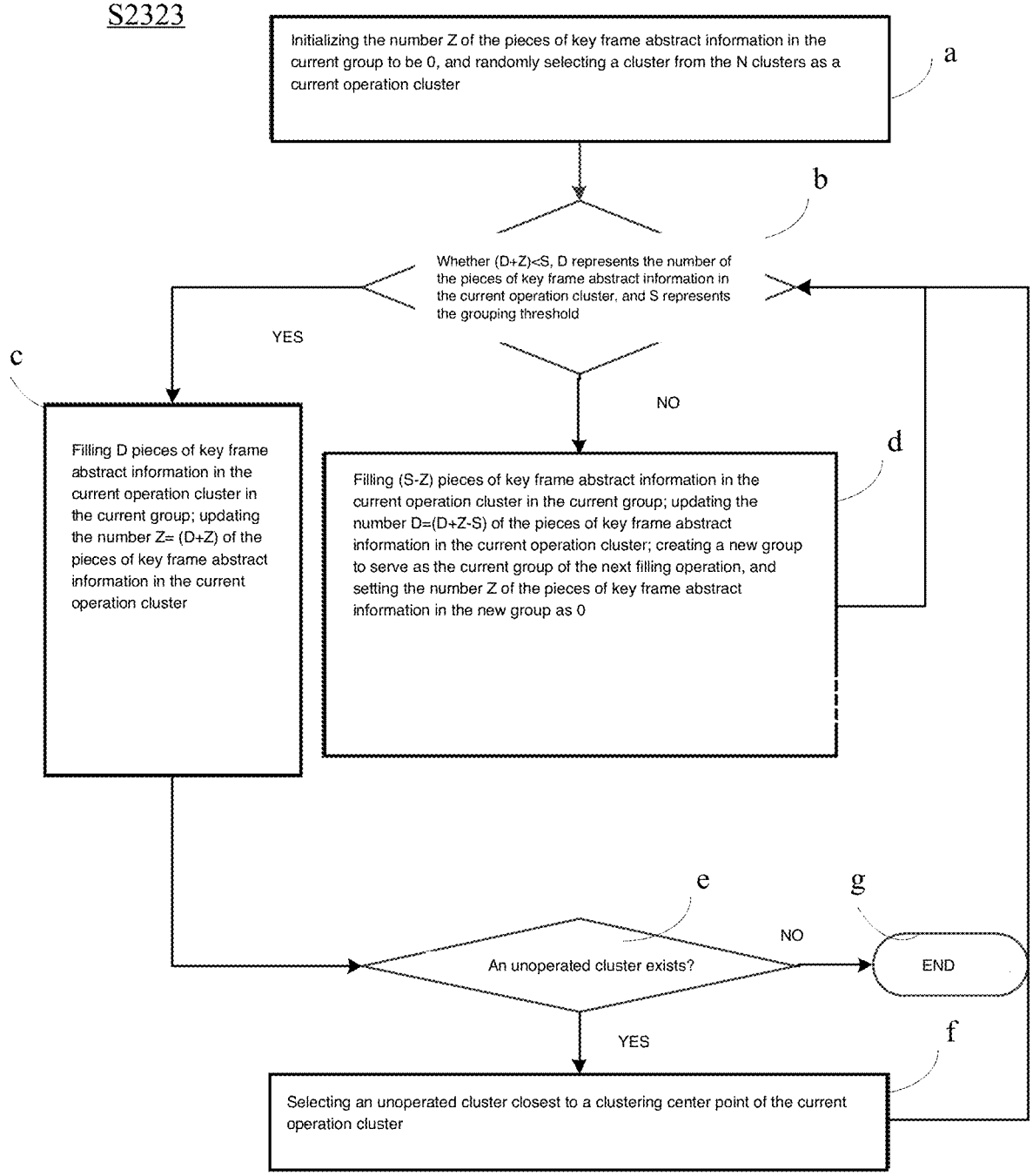
FIG. 6 shows a schematic process block diagram of grouping key frame abstract information of all key frames in a visual localization map according to N clusters of spatial clustering in accordance with one embodiment of the present disclosure.

FIG. 6 shows a schematic process block diagram of grouping the N clusters obtained by spatial clustering according to the size of the grouping threshold in accordance with one embodiment of the present disclosure. The specific implementation process of the above step S1323, the sub-step S1323_1 and the sub-step S1323_2 will be described in detail in connection with FIG. 6.

Step a, initializing the number Z of the key frame abstract information in the current group to be 0, and randomly selecting a cluster from the N clusters obtained by the spatial clustering in the above step S1322 to serve as a current operation cluster.

Step b, comparing (D+Z) with S, if (D+Z)<S, performing step c; otherwise, performing step d, in which D represents the number of the pieces of key frame abstract information in the current operation cluster.

Step c, in the case that (D+Z)<S, performing the following operation:

Filling D pieces of key frame abstract information in the current operation cluster in the current group.

Updating the number Z=(D+Z) of the key frame abstract information in the current group, and proceeding to step e.

Step d, in the case that (D+Z)≥S, performing the following operations:

Filling the (S−Z) pieces of key frame abstract information in the current operation cluster in the current group; and updating the number D=(D+Z−S) of the key frame abstract information in the current operation.

Creating a new group to serve as the current group of the next filling operation, setting the number Z of the key frame abstract information in the new group as 0, and then proceeding to the step b.

Step e, determining whether an unoperated cluster exits is determined. If so, executing step f; otherwise, executing step g.

Step f, selecting an unoperated cluster that is closest to the clustering center point of the current operation cluster, and repeating the above filling steps b, c, and d.

Step g, if no unoperated cluster exists, completing the traversal of the N clusters, and terminating the grouping.

In the above method of grouping the N clusters obtained by the spatial clustering according to the size of the grouping threshold, except for the last group, the number of key frames in the other groups is the same. Accordingly, the visual localization map may be decomposed according to the spatial relationship and sub-map-files of similar sizes may be obtained. As such, that memory management is easy to perform, and the method is generally suitable for various application scenarios.

Figures 7, 8:
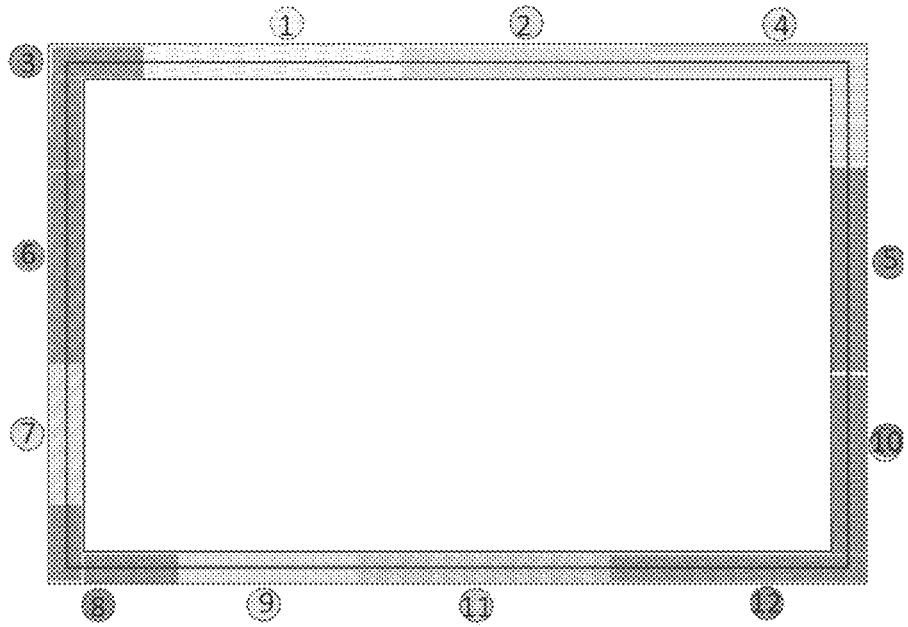
FIG. 7 shows a schematic diagram of a result of grouping key frame abstract information of all key frames in a visual localization map according to N clusters of spatial clustering in accordance with one embodiment of the present disclosure.
FIG. 8 shows a schematic flow diagram of generating and storing a sub-map-file of the group by using the key frame abstract information of the group in accordance with one embodiment of the present disclosure.

FIG. 7 shows a schematic diagram of a result of grouping key frame abstract information of all key frames of a visual localization map according to N clusters of spatial clustering in accordance with one embodiment of the present disclosure. Lines of different gray levels represent different groups. The serial number next to a line of a gray level is the serial number of the group. The visual localization map is a three-dimensional map, but FIG. 7 is a two-dimensional plan schematic diagram in order to easily understand the grouping effect. As shown in FIG. 7, the visual localization map is two-way road mapping similar to FIG. 3. The visual localization map is decomposed into 12 sub-maps according to the grouping method based on spatial clustering. Each sub-map space is aggregated, and the sub-maps are relatively independent from each other. Therefore, it is easy to load the sub-map-file according to the current position when in use.

In some embodiments, in step S1400, sub-map-file may be generated and stored for each group using the key frame abstract information of the group. Step S1400 may include the following sub-steps, as shown in FIG. 8. The following sub-steps may be performed for each group.

Sub-step S1410, extracting key frames corresponding to the key frame abstract information of the group from the visual localization map, and filling the key frames in the sub-map-file of the group.

For each group, a corresponding sub-map-file is created. The key frames corresponding to the unique identification numbers may be extracted from the visual localization map according to the unique identification numbers in the key frame abstract information included in the group, and may be filled in the sub-map-file corresponding to the group. All key frame abstract information included in the group may be traversed in this way. All corresponding key frames may be filled in the sub-map-file corresponding to the group.

Sub-step S1420, extracting map points matching the key frame abstract information in the group from the visual localization map, and filling the map points in the sub-map-file of the group.

The map points matching the key frames corresponding to the unique identification numbers may be extracted from the visual localization map according to the unique identification numbers in the key frame abstract information included in the group, and may be filled in the sub-map-file corresponding to the group. All key frame abstract information included in the group may be traversed in this way, and the map points respectively matching all key frames may be filled in the sub-map-file corresponding to the group.

Figure 9:
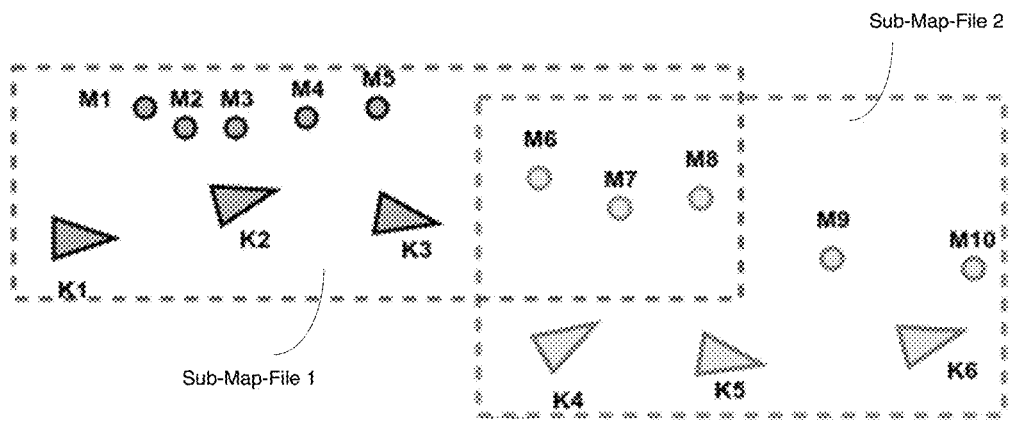
FIG. 9 shows a schematic diagram of data contained in a sub-map-file in accordance with one embodiment of the present disclosure.

FIG. 9 shows a schematic diagram of data contained in a sub-map-file in accordance with one embodiment of the present disclosure. Group 1 may include three pieces of key frame abstract information, which belong to key frames K1, K2, and K3, respectively. The map points matching key frames K1, K2, and K3 include 8 map points M1 to M8 in total. Key frames K1, K2, and K3 and the map points M1 to M8 are extracted from the visual localization map and are filled in the sub-map-file 1 of the group 1. Group 2 also may include three pieces of key frame abstract information, which respectively belong to key frames K4, K5 and K6. The map points matching key frames K4, K5, and K6 include 5 map points M6 to M10 in total. Key frames K4, K5 and K6 and the map points from M6 to M10 are extracted from the visual localization map and are filled in sub-map-file 2 of the group 2. As shown, both sub-map-file 1 and sub-map-file 2 include the map points M6, M7 and M8 having a common view relationship.

Through the above method, a single visual localization map file with a large data size may be decomposed into a plurality of sub-map-files with moderate data sizes to improve the loading efficiency and storage space efficiency of the files.

Figure 10:
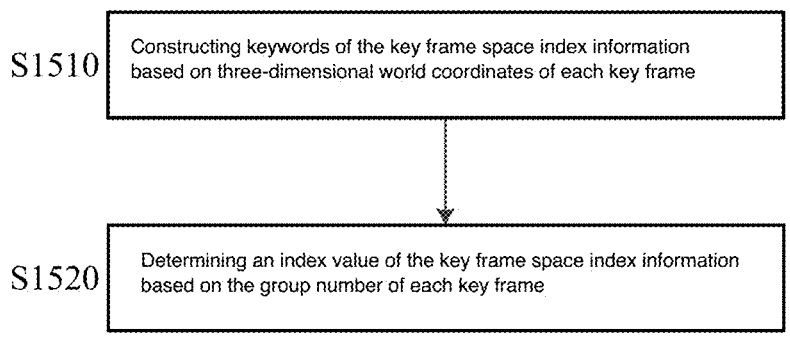
FIG. 10 shows a schematic flow diagram of generating key frame space index information based on key frame abstract information of all groups in accordance with one embodiment of the present disclosure.

In some embodiments, step S1500 of generating key frame space index information based on the key frame abstract information of all groups may include the following sub-steps, as shown in FIG. 10.

Sub-step S1510, constructing keywords of the key frame space index information based on the three-dimensional world coordinates of each key frame.

Sub-step S1520, determining an index value of the key frame space index information based on a group number of the key frame abstract information of each key frame.

The above key frame space index information may be constructed using any existing or future developed technology, such as a K-dimensional tree (KD-Tree) spatial data structure. Based on the key frame space index information, range search and/or nearest neighbor search may be performed by the three-dimensional world coordinates. For example, key frames with a radius of 2 km centered on the current position may be searched based on the current position of an automatic driving vehicle. As another example, the closest 50 key frames may be searched based on the current position. Therefore, the group numbers to which these key frames belong are acquired, and the corresponding sub-map-files are loaded according to the group numbers to construct a local map centered on the current position.

Optionally, the index value may further include key frame abstract information and an offset of the key frame abstract information in its group, that is, the sequential number of the key frame abstract information in the group.

In some embodiments, step S1400, for each group, generating and storing a sub-map-file of the group using the key frame abstract information of the group further may include: calculating a checksum of each sub-map-file.

Figure 11:
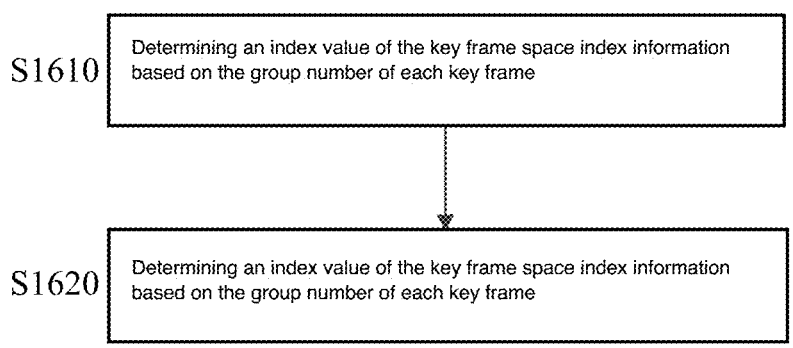
FIG. 11 shows a schematic flow diagram of generating and storing a master map file according to the key frame space index information in accordance with one embodiment of the present disclosure.

In some embodiments, step S1600 of generating and storing a master map file according to the key frame space index information may further include the following sub-steps, as shown in FIG. 11.

Step S1610, constructing map metadata by using the key frame space index information constructed in step S1500 and the checksum calculated in step S1400.

Step S1620, storing and outputting the map metadata to the master map file.

According to the master map file, the required sub-map-file may be indexed, and the checksum of the sub-map-file may be obtained. Data integrity check may be performed on the sub-map-file by using its checksum. Therefore, the data integrity of the loaded sub-map-file is ensured, and the system reliability is improved.

Figure 12:
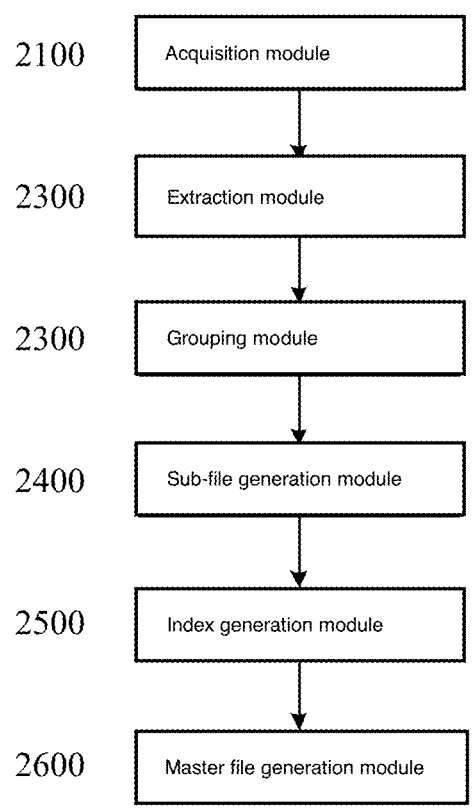
FIG. 12 shows a schematic block diagram of a visual localization map storage device in accordance with one embodiment of the present disclosure.

According to another aspect of the present disclosure, a visual localization map storage device is further provided. FIG. 12 shows a schematic block diagram of a visual localization map storage device in accordance with one embodiment of the present disclosure. As shown in FIG. 12, the device 2000 may include an acquisition module 2100, an extraction module 2200, a grouping module 2300, a sub-file generation module 2400, an index generation module 2500, and a master file generation module 2600.

The acquisition module 2100 may be configured to acquire a visual localization map. The extraction module 2200 may be configured to extract key frame abstract information of each key frame from the visual localization map. The grouping module 2300 may be configured to group the key frame abstract information of all key frames in the visual localization map. The sub-file generation module 2400 may be configured to, for each group, generate and store a sub-map-file of the group by using the key frame abstract information of the group. The index generation module 2500 may be configured to generate key frame space index information based on the key frame abstract information of all groups. The master file generation module 2600 may be configured to generate and store a master map file according to the key frame space index information for indexing the sub-map-file.

In summary, the various modules in the visual localization map storage device 2000 may be configured to specifically perform the corresponding steps in the above visual localization map storage method. By reading the above descriptions of the method, those of ordinary skill in the art may understand the specific implementation and technical effects of the above visual localization map storage device 2000.

According to still another aspect of the present disclosure, a visual localization map storage system is further provided. The system may include a processor and a memory. Computer program instructions configured to perform the various steps in the above visual localization map storage method according to the embodiment of the present disclosure are stored in the memory. The processor may be configured to run the computer program instructions stored in the memory to perform the corresponding steps in the above visual localization map storage method according to the embodiment of the present disclosure, and is further configured to implement the acquisition module 2100, the extraction module 2200, the grouping module 2300, the sub-file generation module 2400, the index generation module 2500, and the master file generation module 2600 in the visual localization map storage device 2000 according to the embodiment of the present disclosure.

According to still another aspect of the present disclosure, a storage medium is further provided, wherein program instructions are stored on the storage medium, and the program instructions, when run by a computer or a processor, are configured to perform the corresponding steps in the above visual localization map storage method according to the embodiment of the present disclosure, and are further configured to implement corresponding modules in the visual localization map storage device according to the embodiment of the present disclosure. The storage medium may include, for example, a storage component of a tablet computer, a hard disk of a personal computer, a read-only memory (ROM), an erasable programmable read-only memory (EPROM), a portable compact disk read-only memory (CD-ROM), a USB memory, or any combination of the above storage media. The computer-readable storage medium may be any combination of one or more computer-readable storage media.

Figure 13:
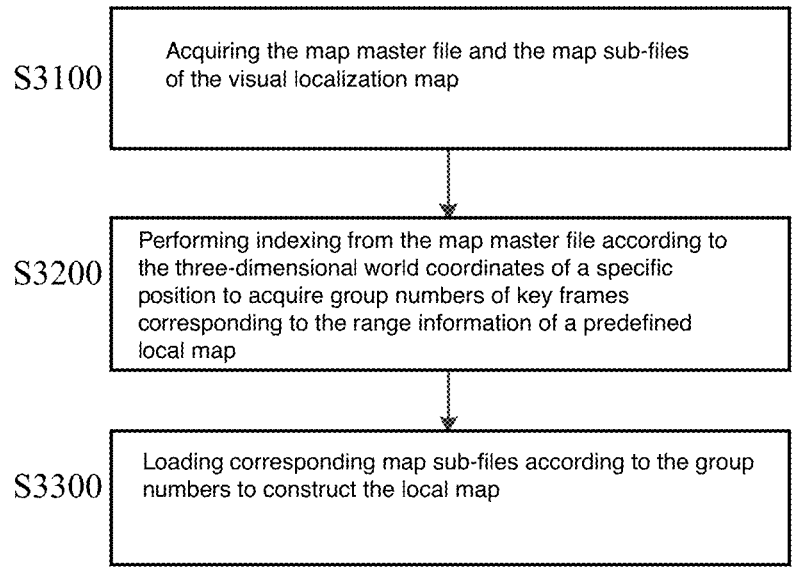
FIG. 13 shows a schematic flow diagram of a visual localization map loading method in accordance with one embodiment of the present disclosure.

Moreover, in accordance with one aspect of the present disclosure, a visual localization map loading method is provided. FIG. 13 shows a schematic flow diagram of a visual localization map loading method in accordance with one embodiment of the present disclosure. As shown in FIG. 13, the method 3000 may include the following steps.

Step S3100, acquiring the master map file and the sub-map-files of the visual localization map obtained by using the above visual localization map storage method.

The master map file and the sub-map-files of the visual localization map obtained according to the visual localization map storage method, device and system or the storage medium in the embodiment of the present disclosure are acquired. The sub-map-files may be decomposed sub-maps of the visual localization map. The master map file stores metadata describing the sub-map-files. The metadata may include key frame space index information constructed based on the three-dimensional world coordinates of the key frames of the visual localization map. The metadata may also include a checksum of the sub-map-files. The sub-map-files and related information may be indexed using the metadata.

Step S3200: indexing the master map file acquired in step S3100 according to the three-dimensional world coordinates of a specific position to acquire group numbers of key frames corresponding to range information of a predefined local map.

The specific position, for example, may be a current located position of an automatic driving vehicle. The range information of the predefined local map may be determined according to actual application scenarios and/or system resources. For example, the automatic driving vehicle driving at high speed needs to be navigated and localized by using a local map of a larger geographical area. If the system has abundant memory resources, a larger local map may also be loaded. The group numbers of the key frames in the range information of the predefined local map are indexed from the master map file acquired in step S3100 using the three-dimensional world coordinates of the specific position as key words. The corresponding sub-map-files are loaded according to the indexed group numbers to construct the local map. In one example, 100 key frames are indexed based on the current position, and the group numbers of the 100 key frames include 3, 4, and 5.

In some embodiments, the range information of the predefined local map may include the number of key frames closest to the three-dimensional world coordinates of the specific position. For example, 100 key frames closest to the three-dimensional world coordinates of the current position.

In some embodiments, the range information of the predefined local map may include a radius distance using the three-dimensional world coordinates of the current position as the circle center. For example, a range within a radius distance of 3 km using the current position as the circle center.

Step S3300, loading corresponding sub-map-files according to the group numbers acquired in step S3200 to construct a local map. In the above example, sub-map-file 3, sub-map-file 4, and sub-map-file 5 corresponding to group numbers 3, 4, and 5 may be loaded to construct the desired local map.

Optionally, the method 3000 may further include: releasing a memory space of the sub-map-file that does not correspond to the group number in the local map.

As the current position may change in real-time, for example, during the driving of the automatic driving vehicle, the required local map also needs to be updated in time. Indexing is performed based on the new position to obtain new group numbers. Still taking the above example as an example, after the current position changes, the new group numbers obtained by the indexing are 4, 5, and 7. Compared with the currently loaded sub-map-files 3, 4, and 5, it is found that 4, 5 are old group numbers, 7 is a new group number, and 3 is an unnecessary group number. Thus, the sub-map-file 4 and the sub-map-file 5 already exist in the current local map, and only the sub-map-file 7 is loaded. At the same time, the sub-map-file 3 is no longer needed, so the memory space of the sub-map-file 3 may be released. Therefore, unnecessary memory consumption is reduced, and the use efficiency of the system is improved.

In some embodiments, step S3300, loading corresponding sub-map-files according to the group numbers to construct the local map may further include the following sub-steps:

Sub-step 1, acquiring a checksum of the sub-map-files corresponding to the group numbers from the master map file.

Sub-step 2, checking the sub-map-files corresponding to the group numbers according to the checksum.

The loaded sub-map-files may be checked using the checksum that is calculated during the generation of the sub-map-files to ensure the data integrity of the sub-map-files. In this way, the reliability of the system is improved.

Figure 14:
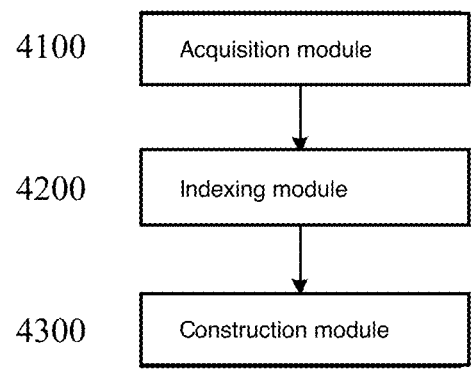
FIG. 14 shows a schematic block diagram of a visual localization map loading device in accordance with one embodiment of the present disclosure.

According to another aspect of the present disclosure, a visual localization map loading device is further provided. FIG. 14 shows a schematic block diagram of a visual localization map loading device in accordance with one embodiment of the present disclosure. As shown in FIG. 14, the device 4000 may include an acquisition module 4100, an indexing module 4200 and a construction module 4300.

The acquisition module 4100 may be configured to acquire the master map file and the sub-map-files of the visual localization map obtained using the above visual localization map storage method. The indexing module 4200 may be configured to perform indexing from the master map file according to the three-dimensional world coordinates of a specific position to acquire a group number of key frames corresponding to the range information of a predefined local map. The construction module 4300 may be configured to load corresponding sub-map-files according to the group numbers to construct the local map.

In summary, the various modules in the visual localization map loading device 4000 are configured to specifically perform the corresponding steps in the above visual localization map loading method. By reading the above descriptions of the method, those of ordinary skill in the art may understand the specific implementation and technical effects of the above visual localization map loading device 4000.

According to still another aspect of the present disclosure, a visual localization map loading system is further provided. The system may include a processor and a memory. Computer program instructions configured to perform the various steps in the above visual localization map loading method according to the embodiment of the present disclosure are stored in the memory. The processor may be configured to run the computer program instructions stored in the memory to perform the corresponding steps in the above visual localization map loading method according to the embodiment of the present disclosure, and is further configured to implement the acquisition module 4100, the indexing module 4200 and the construction module 4300 in the visual localization map loading device 4000 according to the embodiment of the present disclosure.

According to still another aspect of the present disclosure, a storage medium is further provided, wherein program instructions are stored on the storage medium, and the program instructions, when run by a computer or a processor, are configured to perform the corresponding steps in the above visual localization map loading method according to the embodiment of the present disclosure, and are further configured to implement corresponding modules in the visual localization map loading device according to the embodiment of the present disclosure. The storage medium may include, for example, a storage component of a tablet computer, a hard disk of a personal computer, a read-only memory (ROM), an erasable programmable read-only memory (EPROM), a portable compact disk read-only memory (CD-ROM), a USB memory, or any combination of the above storage media. The computer-readable storage medium may be any combination of one or more computer-readable storage media.

Those of ordinary skill in the art can be aware that units and algorithm steps of the examples described in the embodiments disclosed herein can be implemented by electronic hardware or a combination of computer software and the electronic hardware. Whether these functions are implemented in the form of hardware or software is determined by specific applications and design constraint conditions of the technical solutions. Those skilled can implement the described functions by using different methods for each specific application, but this implementation should not be considered as going beyond the scope of the present disclosure.

In the several embodiments provided by the present application, it should be understood that, the disclosed devices and methods may be implemented in other manners. For example, the device embodiments described above are merely illustrative, for example, the division of the units is only a logic function division, other division manners may exist during practical implementation, for example, a plurality of units or components may be combined or integrated to another device, or some features may be omitted or not implemented.

In the description provided herein, numerous specific details are set forth. However, it may be understood that the embodiments of the present disclosure may be practiced without these specific details. In some examples, well-known methods, structures and techniques are not shown in detail so as not to obscure the understanding of the description.

Similarly, it should be understood that, to simplify the present disclosure and help to understand one or more of various disclosure aspects, in the description of the exemplary embodiments of the present disclosure, various features of the present disclosure are sometimes grouped together into a single embodiment, figure or in the description thereof. However, the method of the present disclosure should not be construed as reflecting the following intention, that is, the claimed disclosure requires more features than those specifically recorded in each appended claim. Or rather, as reflected by the corresponding claims, the disclosure points lie in that the corresponding technical problems may be solved by using fewer features than all of the features of a single disclosed embodiment. Therefore, the claims following the specific embodiments are hereby explicitly incorporated into the embodiments, and each of the claims is used as a separate embodiment of the present disclosure.

It will be understood by those skilled in the art that, all features disclosed in the specification (including the accompanying claims, the abstract and the drawings) and all processes or units of any method or device so disclosed may be combined in any manner, unless the features are mutually exclusive. Unless otherwise expressly stated, each feature disclosed in this specification (including the accompanying claims, the abstract and the drawings) may be substituted with alternative features that provide the same, equivalent or similar purpose.

In addition, those skilled in the art will appreciate that, although some embodiments described herein include certain features included in other embodiments rather than other features, combinations of features of different embodiments are intended to be within the scope of the present disclosure, and form different embodiments. For example, in the claims, any one of the claimed embodiments may be combined in any manner for use.

Various component embodiments of the present disclosure may be implemented by hardware, or software modules running on one or more processors, or by the combination thereof. Those skilled in the art should understand that, a microprocessor or a digital signal processor (DSP) may be used in practice to implement some or all of the functions of some of the modules in the visual localization map loading device in accordance with the embodiments of the present disclosure. The present disclosure may also be implemented to perform a part or all device programs (e.g., computer programs and computer program products) of the method described herein. Such programs for implementing the present disclosure may be stored on a computer-readable medium or may be in the form of one or more signals. Such signals may be downloaded from an Internet website, provided on a carrier signal, or provided in any other form.

It should be noted that the above embodiments illustrate the present disclosure rather than limiting the present disclosure, and furthermore, substitute embodiments may be designed by those skilled in the art without departing from the scope of the appended claims. In the claims, any reference signs between parentheses shall not be construed as limitations to the claims. The word "include" does not exclude the presence of elements or steps that are not recited in the claims. The word "a" or "an" in front of an element does not exclude the presence of multiple such elements. The present disclosure may be implemented by means of hardware including several different elements and by means of a suitably programmed computer. In the unit claims enumerating several means, several of these means may be specifically embodied by the same hardware item. The use of the words first, second, and third does not indicate any sequence. These words may be interpreted as names.

The foregoing descriptions are merely specific embodiments of the present disclosure or illustrations of the specific embodiments, and the protection scope of the present disclosure is not limited thereto. Any skilled one familiar with this art could readily think of variations or substitutions within the disclosed technical scope of the present disclosure, and these variations or substitutions shall fall within the protection scope of the present disclosure. The protection scope of the claims should prevail over the protection scope of the present disclosure.

The invention claimed is:

1. A method, comprising:
acquiring a visual localization map;
extracting, by a processor, key frame abstract information from each key frame of the visual localization map, wherein the key frame abstract information comprises unique identification numbers and three-dimensional world coordinates of the key frames;
grouping, by the processor, the key frame abstract information of all key frames of the visual localization map into a plurality of groups, comprising:
determining, according to the number of all key frames of the visual localization map, a number N representing the number of the plurality of groups;
performing spatial clustering on the key frame abstract information of all key frames in the visual localization map according to the three-dimensional world coordinates of the key frames to obtain N clusters; and grouping the key frame abstract information of all key frames in the visual localization map according to the N clusters;

generating and storing a plurality of sub-map-files by generating and storing, for each of the plurality of groups, a sub-map-file using the key frame abstract information of the group for each of the plurality of groups;

generating key frame space index information based on the key frame abstract information of the plurality of groups;

generating and storing a master map file according to the key frame space index information for indexing the sub-map-files; and constructing, according to the master map file and the sub-map-files, a local map for automatic localization of a vehicle.

2. The method of claim 1, wherein grouping the key frame abstract information of all key frames of the visual localization map comprises:

grouping the key frame abstract information of all key frames in the visual localization map according to the unique identification numbers.

3. The method of claim 2, wherein grouping the key frame abstract information of all key frames in the visual localization map according to the unique identification numbers comprises:

sorting the key frame abstract information of all key frames in the visual localization map according to sizes of the unique identification numbers; and grouping the sorted key frame abstract information, wherein sequence numbers of the key frame abstract information in each of the groups are continuous, and wherein the number of pieces of key frame abstract information in each group is not greater than a grouping threshold.

4. The method of claim 3, wherein grouping the sorted key frame abstract information comprises:

assigning the $(S \times i+1)^{th}$ to $(S \times i+S)^{th}$ pieces of the sorted key frame abstract information to the $(i+1)^{th}$ group, wherein S is equal to the grouping threshold, $$0 \le i < \left[\frac{M}{S}\right],$$

and wherein M represents the number of the key frames in the visual localization map; and assigning ungrouped key frame abstract information to the last group of the plurality of groups.

5. The method of claim 1, wherein grouping the key frame abstract information of all key frames in the visual localization map according to the N clusters comprises:

using each of the plurality of clusters as one of the groups.

6. The method of claim 1, wherein determining the number N according to the number of all key frames in the visual localization map comprises:

calculating the number N using the following formula:

$$N = \left[\frac{M+S-1}{S}\right],$$

wherein M represents the number of the key frames in the visual localization map, and wherein S represents the grouping threshold.

7. The method of claim 1, wherein grouping the key frame abstract information of all key frames in the visual localization map according to the N clusters comprises:

filling the key frame abstract information of one of the plurality of clusters in one of the groups;

in response to determining that all key frame abstract information in the cluster is filled or that the number of the pieces of the key frame abstract information in the group reaches the grouping threshold S, starting to fill the next group; and in response to determining that unoperated clusters exist in the clusters, selecting an unoperated cluster closest to a clustering center point of a current operation cluster to perform the filling step iteratively to traverse the plurality of clusters.

8. The method of claim 1, wherein for each of the plurality of groups, generating and storing the sub-map-file of the group using the key frame abstract information of the group comprises:

extracting key frames corresponding to the key frame abstract information in the group from the visual localization map, and filling the key frames in the sub-map-file of the group;

extracting map points matching the key frame abstract information in the group from the visual localization map; and filling the map points in the sub-map-file of the group.

9. The method of claim 1, wherein generating the key frame space index information based on the key frame abstract information of the plurality of groups comprises:

constructing keywords of the key frame space index information based on the three-dimensional world coordinates of each key frame; and indexing a group number of the key frame abstract information of each key frame using the keywords.

10. The method of claim 8, wherein for each group, generating and storing the sub-map-file of the group using the key frame abstract information of the group further comprises:

calculating a checksum of each sub-map-file.

11. The method of claim 10, wherein generating and storing the master map file according to the key frame space index information comprises:

constructing map metadata using the key frame space index information and the checksum;

storing the map metadata; and outputting the map metadata to the master map file.

12. The method of claim 1, wherein constructing, according to the master map file and the sub-map-files, the local map for automatic localization of the vehicle comprises:

indexing the master map file according to three-dimensional world coordinates of a specific position of the vehicle to acquire group numbers of the key frames; and loading the sub-map-files corresponding to the group numbers to construct the local map.

13. The method of claim 12, further comprises acquiring the group numbers of the key frames according to the number of key frames closest to three-dimensional world coordinates of a current position of the vehicle.

14. The method of claim 12, further comprises acquiring the group numbers of the key frames according to a radius distance determined using three-dimensional world coordinates of a current position of the vehicle as a circle center.

15. The method of claim 12, further comprising:

releasing a memory space of the sub-map-file that does not correspond to the group number in the local map.

16. The method of claim 12, wherein loading corresponding sub-map-files according to the group numbers to construct the local map further comprises:

acquiring a checksum of the sub-map-files corresponding to the group numbers using the master map file; and
checking the sub-map-files corresponding to the group numbers according to the checksum.

17. A system for storing and loading visual localization maps, comprising:

a memory; and
a processor to:
acquire a visual localization map;
extract key frame abstract information from each key frame of the visual localization map, wherein the key frame abstract information comprises unique identification numbers and three-dimensional world coordinates of the key frames;
group the key frame abstract information of all key frames of the visual localization map into a plurality of groups;
generate and store a plurality of sub-map-files by generating and storing, for each of the plurality of groups, a sub-map-file of the group using the key frame abstract information of the group;
generate key frame space index information based on the key frame abstract information of the plurality of groups;
generate and store a master map file according to the key frame space index information for indexing the sub-map-files; and
construct, according to the master map file and the sub-map-files, a local map for automatic localization of a vehicle, wherein to group the key frame abstract information all key frames of the visual localization map into the plurality of groups, the processor is further to:
determine, according to the number of all key frames of the visual localization map, a number N representing the number of the plurality of groups;
perform spatial clustering on the key frame abstract information of all key frames in the visual localization map according to the three-dimensional world coordinates of the key frames to obtain N clusters; and
group the key frame abstract information of all key frames in the visual localization map according to the N clusters.

18. The system of claim 17, wherein the processor is further to:

index the master map file according to three-dimensional world coordinates of a specific position to acquire group numbers of the key frames; and
load the sub-map-files corresponding to the group numbers to construct the local map.

19. A non-transitory computer-readable storage medium including instructions that, when accessed by a processor, cause the processor to:

acquire a visual localization map;
extract key frame abstract information from each key frame of the visual localization map, wherein the key frame abstract information comprises unique identification numbers and three-dimensional world coordinates of the key frames;
group the key frame abstract information of all key frames of the visual localization map into a plurality of groups;
generate and store a plurality of sub-map-files by generating and storing, for each of the plurality of groups, a sub-map-file using the key frame abstract information of the group;
generate key frame space index information based on the key frame abstract information of the plurality of groups;
generate and store a master map file according to the key frame space index information for indexing the sub-map-file; and
construct, according to the master map file and the sub-map-files, a local map for automatic localization of a vehicle, wherein to group the key frame abstract information all key frames of the visual localization map into the plurality of groups, the processor is further to:
determine, according to the number of all key frames of the visual localization map, a number N representing the number of the plurality of groups;
perform spatial clustering on the key frame abstract information of all key frames in the visual localization map according to the three-dimensional world coordinates of the key frames to obtain N clusters; and
group the key frame abstract information of all key frames in the visual localization map according to the N clusters.

* * * * *